United States Patent
Van Berge et al.

(10) Patent No.: US 7,365,040 B2
(45) Date of Patent: Apr. 29, 2008

(54) CATALYSTS

(75) Inventors: Peter Jacobus Van Berge, Sasolburg (ZA); Sean Barradas, Parys (ZA)

(73) Assignee: Sasoltechnology (Proprietary) Limited, Johannesburg (JP)

( * ) Notice: Subject to any disclaimer, the term of this patent is extended or adjusted under 35 U.S.C. 154(b) by 0 days.

(21) Appl. No.: 11/113,825

(22) Filed: Apr. 25, 2005

(65) Prior Publication Data

US 2005/0245623 A1 Nov. 3, 2005

Related U.S. Application Data

(60) Provisional application No. 60/565,468, filed on Apr. 26, 2004.

(51) Int. Cl.
  B01J 21/00 (2006.01)
  B01J 23/40 (2006.01)
  B01J 23/58 (2006.01)
  B01J 23/60 (2006.01)
  B01J 20/00 (2006.01)

(52) U.S. Cl. ............ 502/260; 502/252; 502/301; 502/326; 502/327; 502/328; 502/329; 502/330; 502/331; 502/332; 502/349; 502/350; 502/355; 502/407; 502/415; 502/439

(58) Field of Classification Search ........... 502/252, 502/301, 260, 326–332, 349, 350, 355, 439, 502/407, 415

See application file for complete search history.

(56) References Cited

U.S. PATENT DOCUMENTS 3,536,632 A * 10/1970 Kroll .................. 502/107
4,794,099 A * 12/1988 Iglesia et al. .......... 502/241
4,960,801 A    10/1990 Iglesia et al.
5,187,138 A *  2/1993 Davis ................. 502/255
5,292,989 A *  3/1994 Davis ................. 585/751
5,733,839 A    3/1998 Espinoza et al.
6,235,677 B1   5/2001 Manzer et al.
6,353,035 B2   3/2002 Manzer et al.
6,455,462 B2   9/2002 Van Berge et al.
6,462,098 B1  10/2002 Vogel et al.
6,465,530 B2  10/2002 Roy-Auberger et al.

(Continued)

FOREIGN PATENT DOCUMENTS

EP    0 363 537    4/1990

(Continued)

OTHER PUBLICATIONS

Johnson M. "Surface Area Stability of Aluminas." *Journal of Catalysis* (1990) vol. 123, pp. 245-259.

(Continued)

*Primary Examiner*—Cam N. Nguyen
(74) *Attorney, Agent, or Firm*—Ladas & Parry LLP

(57) ABSTRACT

A process for preparing a cobalt-based Fischer-Tropsch synthesis catalyst includes introducing a soluble modifying component precursor of the formula $Mc(OR)_x$, where Mc is a modifying component selected from the group comprising Si, Ti, Cu, Zn, Zr, Mn, Ba, Ni, Na, K, Ca, Sn, Cr, Fe, Li, Tl, Sr, Ga, Sb, V, Hf, Th, Ce, Ge, U, Nb, Ta, W or La, R is an alkyl or acyl group, and x is an integer having a value of from 1 to 5, onto and/or into a cobalt-based Fischer-Tropsch synthesis catalyst precursor, which comprises a porous pre-shaped catalyst support supporting cobalt in an oxidized form. The resultant modified cobalt-based Fischer-Tropsch synthesis catalyst precursor is reduced to obtain a cobalt-based Fischer-Tropsch synthesis catalyst.

7 Claims, 1 Drawing Sheet

U.S. PATENT DOCUMENTS

Figure 1:
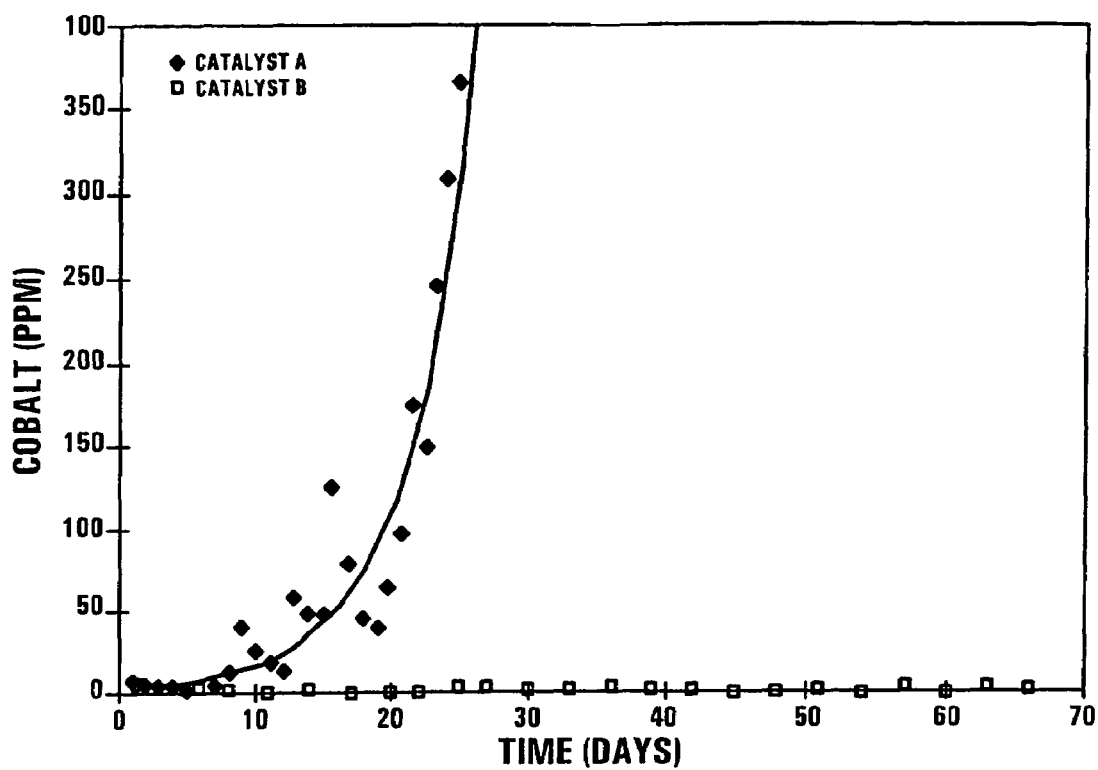

| | | | |
|---|---|---|---|
| 6,806,226 B2 | 10/2004 | Van Berge et al. | |
| 2004/0132832 A1* | 7/2004 | Espinoza et al. | 518/716 |
| 2005/0124490 A1* | 6/2005 | Timken | 502/325 |

FOREIGN PATENT DOCUMENTS

| | | |
|---|---|---|
| EP | 1 058 580 | 2/2004 |
| WO | 99/42214 A1 | 8/1999 |
| WO | 02/07883 | 1/2002 |
| WO | 03/012008 | 2/2003 |
| WO | 03/035257 | 5/2003 |

OTHER PUBLICATIONS

Absi-Halabi, M., et al. "Studies on Pore Size Control of Alumina: Preparation of Alumina Catalyst Extrudates with Large Unimodal Pore Structure by Low Temperature Hydrothermal Treatment." *Preparation of Catalysts V, Elsevier Science Publishers B.V.* (1991) pp. 155-163.

Burtin, P., et al. "Influence of Surface Area and Additives on the Thermal Stability of Transition Alumina Catalyst Supports. I: Kinetic Data" *Applied Catalysis, Elsevier Science Publishers B.V.* (1987) vol. 34, pp. 225-238.

* cited by examiner

CATALYSTS

This application claims the benefit of U.S. Provisional Application No. 60/565,468 filed Apr. 26, 2004 and incorporates the same by reference.

THIS INVENTION relates to catalysts. It relates in particular to a process for preparing a cobalt-based Fischer-Tropsch synthesis catalyst, and to a Fischer-Tropsch synthesis catalyst when prepared by the process.

When a Fischer-Tropsch synthesis catalyst that has been produced from a pre-shaped catalyst support, which is partially soluble in an acid or neutral aqueous solution, by means of aqueous slurry phase impregnation of cobalt as an active catalyst component onto the catalyst support, drying the impregnated support, calcining the dried impregnated support to obtain a catalyst precursor, and reducing the catalyst precursor to obtain a Fischer-Tropsch synthesis catalyst, is used for Fischer-Tropsch synthesis in a three-phase bubble column, contamination of the wax product produced during Fischer-Tropsch synthesis with ultra-fine particulate matter enriched in cobalt, is experienced. The wax product is defined as the hydrocarbon product that is a liquid at the applied Fischer-Tropsch synthesis conditions and that is withdrawn as such from the reactor. It is believed that this wax product contamination is as a result of one or both of the following mechanisms:

Support dissolution during the aqueous based impregnation step can result in precipitation and coating of the bulk support material with a physically bonded amorphous layer whereon cobalt will deposit during the conclusion of the impregnation step. The presence of this physically bonded layer contributes to insufficient anchoring of the Fischer-Tropsch synthesis active cobalt crystallites, and facilitates the eventual dislodging and washing out of cobalt rich ultra-fine particulate matter from the porous catalyst during extended Fischer-Tropsch synthesis in a three phase bubble column reactor.

The Fischer-Tropsch synthesis catalyst is susceptible to hydrothermal attack that is inherent to realistic synthesis conditions, ie syngas conversions in excess of 50% at medium pressure operation where the synthesis gas is not unduly diluted. A successful hydrothermal attack on the exposed (and unprotected) support material will result in contamination of the produced wax product with ultra-fine cobalt rich particulate matter.

EP 1058580 and WO 02/07883 teach treating a pre-shaped catalyst support with a modifying component, to obtain a modified catalyst support which is less soluble in neutral and acid aqueous solutions. A Fischer-Tropsch synthesis catalyst is then formed from the modified catalyst support, by means of an aqueous slurry phase impregnation of an active catalyst component such as cobalt (Co) onto the modified catalyst support, drying the impregnated support, followed by calcination thereof to obtain a catalyst precursor, and thereafter reducing the catalyst precursor. When the resultant catalyst is used for wax production in a three-phase bubble column Fischer-Tropsch synthesis reaction, sustained production of clean wax product, ie a wax product substantially free of ultra-fine, ie sub-micron, particulate matter enriched in cobalt, is possible.

While Fischer-Tropsch synthesis catalysts obtained by these processes give good results, their manufacture thus involves having to add a support modifying component to the pre-shaped catalyst supports prior to impregnation thereof. It is thus an object of this invention to produce a Fischer-Tropsch synthesis catalyst with which sustained production of clean wax product (ie wax product containing less than 50 mass ppm total cobalt) in a three-phase bubble column Fischer-Tropsch synthesis is possible, but which does not require the addition of a modifying component immediately after production of the pre-shaped support from which the Fischer-Tropsch synthesis catalyst is formed.

Thus, according to a first aspect of the invention, there is provided a process for preparing a cobalt-based Fischer-Tropsch synthesis catalyst, which process includes introducing a soluble modifying component precursor of the formula $Mc(OR)_x$, where Mc is a modifying component selected from the group comprising Si, Ti, Cu, Zn, Zr, Mn, Ba, Ni, Na, K, Ca, Sn, Cr, Fe, Li, Tl, Sr, Ga, Sb, V, Hf, Th, Ce, Ge, U, Nb, Ta, W or La, R is an alkyl or acyl group, and x is an integer having a value of from 1 to 5, onto and/or into a cobalt-based Fischer-Tropsch synthesis catalyst precursor comprising a porous pre-shaped catalyst support supporting cobalt in an oxidized form, wherein the catalyst support is selected from $Al_2O_3$, titania, magnesia, silica-alumina and zinc oxide, to obtain a modified cobalt-based Fischer-Tropsch synthesis catalyst precursor; and reducing the modified cobalt-based Fischer-Tropsch synthesis catalyst precursor to obtain a cobalt-based Fischer-Tropsch synthesis catalyst.

In particular, the introduction of the modifying component precursor onto and/or into the catalyst precursor may be performed by impregnation such as slurry phase or incipient wetness impregnation, or by chemical vapour phase deposition.

The modifying component precursor is thus soluble in a suitable non-aqueous solvent, such as an organic solvent.

The invention extends to a Fischer-Tropsch catalyst when produced by the process of the first aspect of the invention.

The porous pre-shaped catalyst support may, in particular, be in particulate form. In principle, it may be any commercially available pre-shaped alumina ($Al_2O_3$), titania ($TiO_2$), magnesia (MgO), silica-alumina or and zinc oxide (ZnO). The support preferably has an average pore diameter between 8 and 50 nanometers, more preferably between 10 and 15 nanometers. The support pore volume may be between 0.1 and 1 ml/g, preferably between 0.3 and 0.9 ml/g. The average particle size may be between 1 and 500 micrometers, preferably between 10 and 250 micrometers, still more particularly between 45 and 200 micrometers. $Al_2O_3$ is preferred as the support, and the invention is described further hereunder with reference to $Al_2O_3$ as the support.

When the pre-shaped catalyst support is $Al_2O_3$, it may, in principle, be any suitable $Al_2O_3$ support. For example, the $Al_2O_3$ support may be that obtainable under the trademark Puralox SCCa 2/150 from SASOL Germany GmbH. Puralox SCCa 2/150 (trademark) is a spray-dried $Al_2O_3$ support consisting of a mixture of gamma and delta $Al_2O_3$.

To a porous pre-shaped catalyst support, as hereinbefore described, is thus added the cobalt in an oxidized form, thereby to form the catalyst precursor. For example, the catalyst support may be impregnated, eg by means of aqueous slurry or incipient wetness impregnation, with a precursor of cobalt, and thereafter calcined so as to oxidize the cobalt precursor, and thus produce the cobalt-based Fischer-Tropsch synthesis catalyst precursor.

The support, prior to this impregnation, is preferably an untreated support. In other words, the support has then preferably not been treated prior to use thereof in producing the catalyst precursor, such as to add a modifying component thereto to suppress its susceptibility to hydrothermal attack during Fischer-Tropsch synthesis involving the use of the catalyst and/or to provide protection against support dissolution during an aqueous phase impregnation catalyst preparation step.

Hydrothermal attack is defined as the sintering of the $Al_2O_3$ support during Fischer-Tropsch synthesis due to exposure to high temperature and water. Sintering may take place as proposed in a model postulated by M. F. L. Johnson in Journal of Catalysis, 123 (1990), page 245-259. The $Al_2O_3$ used for the model was in the form of aggregates of particles of undetermined shape. For example, individual particles were considered as being equivalent spheres with diameters between 5 and 14 nm for surface area ranges between 120 $m^2/g$ and 283 $m^2/g$. In order for these aggregates to have mechanical strength, not only must the individual particles be in contact with each other, but the particles should be chemically bonded by means of Al—O—Al bonds, in a three dimensional network. It is suggested by Johnson that the particles grow, ie crystallise, by successive elimination of water from two surface hydroxyl groups residing on adjacent particles, close to an area of contact. This will result in new Al—O—Al bonds forming, and bring more hydroxyl groups closer together with a possibility of more such condensations. These consecutive condensations result in pore enlargement. With time, smaller particles form larger particles. Water plays an important role in accelerating the hydrothermal sintering of the support. Water maintains the hydroxyl group concentration on the surface of the support, thereby increasing the possibility of elimination of two adjacent hydroxyl groups and sintering.

It has been demonstrated in M. Absi-Halabi, A. Stanislaus, and H. Al-Zaid in Preparation of Catalysts V, G. Poncelet, P. A. Jacobs, P. Grange and B. Delmon (eds), Elsevier Science Publishers B.V. Amsterdam, page 155-163, that pore widening is observed for $Al_2O_3$ at a temperature of 150° C. in the presence of water. Also, in these experiments a cycle of hydroxylation-dehydroxylation was proposed, which is believed to cause larger particles which are loosely packed. This may result in a weak cohesion between $Al_2O_3$ particles and a loss in mechanical strength.

It was thus surprisingly found that, by modifying a catalyst precursor with a modifying component in accordance with the invention, a successful Fischer-Tropsch synthesis catalyst, ie a catalyst that does not produce cobalt-rich ultra-fine particulate material to a significant degree (ie more than 50 mass ppm total cobalt in the wax product) during Fischer-Tropsch synthesis in a slurry bubble column reactor, is obtained.

Surprisingly, it has now been found that the modification of a catalyst precursor, as prepared on a pre-shaped support material that is soluble in neutral and acidic aqueous solutions, is sufficient to produce a slurry phase Fischer-Tropsch synthesis catalyst that will ensure the production of cobalt free (i.e. less than 50 mass ppm) wax product during extended synthesis in a slurry phase reactor. Modification of a cobalt catalyst precursor, which has been prepared using an unmodified or pure catalyst pre-shaped support material, demonstrated that the cobalt slurry phase Fischer-Tropsch synthesis catalyst did not produce cobalt rich ultra fine particulates during Fischer-Tropsch synthesis in a slurry bubble column reactor. This provides support for the hypothesis that the mechanism of hydrothermal attack during slurry phase Fischer-Tropsch synthesis at realistic conditions is predominantly responsible for the formation of ultra-fine (i.e. <1 μm) cobalt rich particulate contamination of the wax product. If the formation of ultra-fine particulates during extended slurry phase Fischer-Tropsch synthesis is predominantly caused by the mechanism of hydrothermal attack, this contaminant of the wax product will only be enriched with cobalt during the initial stage of catalyst degradation. The reason for this is that this attack is aimed at the catalyst surface.

In one embodiment of the invention, the modifying component precursor may, in particular, be a silicon-based modifying component precursor, eg an organic silicon compound or agent, so that the modifying component is silicon (Si). The organic silicon compound may be tetra ethoxy silane ('TEOS') or tetra methoxy silane ('TMOS').

When a silicon-based modifying component precursor is used, it may then be used in a quantity such that the silicon level in the resultant modified catalyst precursor is at least 0.06 Si atoms per square nanometer of the catalyst precursor, preferably at least 0.13 Si atoms per square nanometer of the catalyst precursor, and more preferably at least 0.26 Si atoms per square nanometer of the catalyst precursor.

The selected silicon surface coverage should also not result in an undesired structural parameter of the freshly reduced catalyst, as described in U.S. Pat. No. 6,462,098. The mean pore radius (expressed in m) of the freshly reduced catalyst should remain larger than $((L_{min})^2 \theta \phi) \times 10^{-19}$ (Equation 1) and smaller than $((L_{max})^2 \theta \phi) \times 10^{-18}$ (Equation 2), where:

$L_{min}$ is the minimum particle size of the silicon modified catalyst precursor, expressed in m;

$L_{max}$ is the maximum particle size of the silicon modified catalyst precursor, expressed in m;

$\theta$ is the active site density, expressed in terms of the number of metallic cobalt surface atoms per $m^2$ of freshly reduced catalyst surface area; and $\phi$ is the particle void fraction of the freshly reduced catalyst The organic silicon compound or agent may be dissolved in an impregnation solvent, which is typically an organic solvent capable of dissolving the silicon compound, such as ethanol, acetone or propanol. The catalyst precursor may be admixed with the resultant solution to form a treatment mixture. The treatment mixture may be maintained at an elevated temperature for a period of time to impregnate the modifying agent into and/or onto the catalyst precursor. The elevated temperature may be at or near the boiling point of the impregnation solvent. The impregnation may be effected at atmospheric pressure, and the period of time for which the impregnation is effected may be from 1 minute to 20 hours, preferably from 1 minute to 5 hours. The excess solvent or solution may then be removed. The removal of the excess solvent or solution may be effected under a vacuum of 0.01 to 1 bar (absolute pressure: hereinafter indicated by (a)), more preferably 0.01 to 0.1 bar (a), and at temperature equal to the boiling point of the solvent, eg using known drier equipment, fitted with a mixing device, and of which the jacket temperature is thus higher than the solvent boiling point.

The catalyst precursor thus comprises cobalt oxide supported on the catalyst support.

To obtain the catalyst precursor, a single process step comprising impregnation of the support with a cobalt precursor (which is preferably cobalt nitrate, $Co(NO_3)_2 \cdot 6H_2O$), and calcination of the impregnated support, may be sufficient to obtain a desired cobalt loading of the support; however, the calcined precursor may, if necessary to obtain a desired, eg optimum, cobalt loading, be subjected to at least one further process step, eg a second process step, comprising impregnating the support by treating the catalyst precursor from the initial or first process step with cobalt or a precursor thereof such that further impregnation of the catalyst precursor with cobalt or its precursor, occurs, followed by calcination of the impregnated catalyst precursor. This catalyst precursor will then be treated with the modifying component as hereinbefore described.

In one embodiment of the invention, the first and second process steps may be performed by slurry phase impregnation, as described in U.S. Pat. No. 6,455,462.

Thus, in each of the process steps, the slurry impregnation of the support with the cobalt precursor is initially effected at a temperature between 60° C. and 95° C. with the gradual application of vacuum, until a state of incipient wetness is reached for the support; thereafter a maximum vacuum of <20 kPa(a) is applied while ensuring that the temperature does not drop below 60° C., until a loss on ignition which is less than 90% of the loss on ignition value at incipient wetness has been reached, whereafter the impregnated dried support is calcined.

During either or both of the process steps, a dopant capable of enhancing the reducibility of the cobalt, or a precursor of such a dopant, may be added. Thus, a water soluble precursor salt of palladium (Pd) or platinum (Pt) may be added. The palladium or platinum thus acts as a dopant capable of enhancing the reducibility of the cobalt. The mass proportion of the palladium or platinum metal to the cobalt metal may be from 0.01:100 to 0.3:100.

In another embodiment of the invention, the first and second process step may be performed by incipient wetness impregnation, as described in Example 65 of U.S. Pat. No. 5,733,839. Thus, in each process step, the pre-shaped catalyst support is subjected to the incipient wetness impregnation of a solution of the active catalyst component or its precursor, that is equal to the pore volume of the pre-shaped catalyst support, followed by calcination of the impregnated support without drying to produce the catalyst precursor.

According to a second aspect of the invention, there is provided a process for producing a Fischer-Tropsch hydrocarbon product, which process includes subjecting synthesis gas comprising $H_2$ and CO to Fischer-Tropsch reaction in a slurry hydrocarbon synthesis process, in the presence of a cobalt-based Fischer-Tropsch synthesis catalyst according to the first aspect of the invention, thereby producing the Fischer-Tropsch hydrocarbon product.

The invention extends also to a Fischer-Tropsch hydrocarbon product when produced by the process of the second aspect of the invention.

According to a third aspect of the invention, there is provided a process for producing an upgraded Fischer-Tropsch product, which process includes subjecting synthesis gas comprising $H_2$ and CO to Fischer-Tropsch reaction in a slurry hydrocarbon synthesis process, in the presence of a cobalt-based Fischer-Tropsch synthesis catalyst according to the first aspect of the invention, thereby producing a Fischer-Tropsch hydrocarbon product, and subjecting at least a portion of the Fischer-Tropsch hydrocarbon product to a hydroprocessing treatment to produce the upgraded Fischer-Tropsch product.

The invention extends further to an upgraded Fischer-Tropsch product when produced by the process of the third aspect of the invention.

Fischer-Tropsch hydrocarbons may thus be upgraded to more valuable products, by subjecting all or a portion of the hydrocarbon product to the hydroprocessing treatment, which may include fractionation and/or conversion. By 'hydroprocessing treatment' is meant one or more operations in which the molecular structure of at least a portion of the hydrocarbon is changed, and includes both non-catalytic processing (eg steam cracking) and catalytic processing (eg catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and hydrotreating, all conducted at conditions well known in the literature for hydroconversion of hydrocarbon feeds, including hydrocarbon feeds rich in paraffins. Illustrative, but non-limiting, examples of more valuable products formed by such conversion include one or more of synthetic crude oils, liquid fuel, olefins, solvents, lubricating, industrial or medicinal oils, waxy hydrocarbons, nitrogen and oxygen containing hydrocarbon compounds, and the like. 'Liquid fuel' includes one or more of motor gasoline, diesel fuel, jet fuel, and kerosene, while 'lubricating oil' includes, for example, automotive, jet, turbine and metal transfer fluids, and the like.

Figure 2:
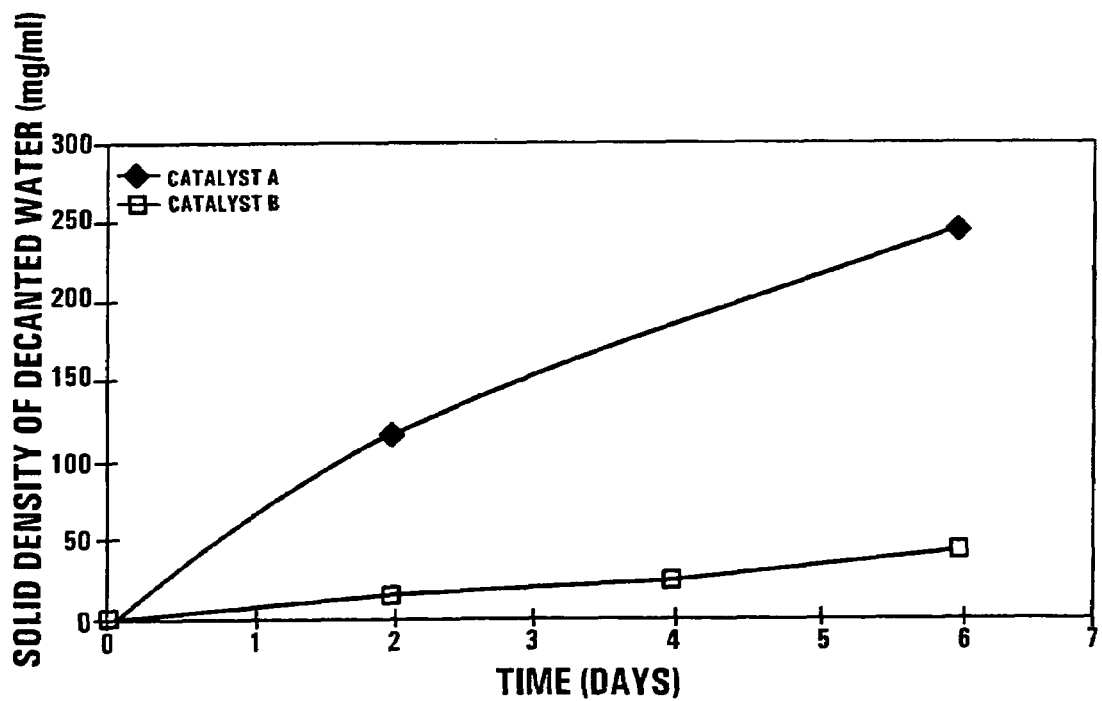

The invention will now be described by way of non-limiting example and with reference to the accompanying drawings in which FIG. 1 is a plot of the cobalt content of secondary filtered wax product against days on line, for wax product produced on pilot plant scale; and FIG. 2 is a plot of solid densities of the decanted water after the interaction of pure $Al_2O_3$ and silica modified $Al_2O_3$ supported cobalt catalysts with water at 200° C. and 15.5 bar(g), as a function of time.

EXAMPLE 1

Preparation of Catalyst Precursor A (Comparative Catalyst Precursor)

A supported cobalt catalyst precursor was prepared on a pure $Al_2O_3$ support, namely a spray-dried Puralox SCCa 2/150 (trademark) $Al_2O_3$ support (Pore volume=0.48 ml/g), in the form of spherical particles, obtainable from Sasol Germany GmbH of Überseering 40, 22297, Hamburg, Germany. A solution of 17.4 kg of $Co(NO_3)_2.6H_2O$, 9.6 g of $(NH_3)_4Pt(NO_3)_2$, and 11 kg of distilled water was mixed with 20.0 kg of the pure $Al_2O_3$ support, by adding the support to the solution. In a first impregnation step, the slurry was added to a conical vacuum drier and continuously mixed. The temperature of this slurry was increased to 60° C. after which a vacuum of 20 kPa (a) was applied. During the first 3 hours of the drying stage, which commenced once the vacuum of 20 kPa(a) had been applied, the temperature was increased slowly and reached 95° C. after 3 hours. Thereafter, in a subsequent drying stage, the drying was performed more aggressively, ie the pressure was decreased to 7 kPa(a). The drying step was terminated after 7 hours, and the resultant dried impregnated support was immediately loaded into a fluidized bed calciner. The loading took about 1 to 2 minutes, and the temperature remained at its set point of about 75° C. The air feed rate was maintained at 23 kg/h (space velocity=1.02 $m^3_n$ air/kg $Co(NO_3)_2.6H_2O$/h). The temperature of the fluidized bed was increased at a rate of 0.4° C./min to a maximum temperature of 250° C. The temperature was maintained at 250° C. for 6 hours. To obtain a catalyst with a cobalt loading of 30 g Co/100 g support, a second impregnation step was performed. A solution of 9.4 kg of $Co(NO_3)_2.6H_2O$, 15.7 g of $(NH_3)_4Pt(NO_3)_2$, and 15.1 kg of distilled water was mixed with 20.0 kg of the catalyst precursor from the first impregnation and calcination, by adding the catalyst precursor to the solution. The temperature of this slurry was increased to 60° C. after which a vacuum of 20 kPa (a) was applied. During the first 3 hours of the drying stage, which commenced once the vacuum of 20 kPa(a) had been applied, the temperature was increased slowly and reached 95° C. after 3 hours. Thereafter, in a subsequent drying stage, the drying was performed more aggressively, ie the pressure was decreased to 7 kPa (a). The drying step was terminated after 7 hours, and the resultant dried impregnated support was loaded immediately into a fluidized bed calciner. The loading took about 1 to 2 minutes, and the temperature remained at its set point of about 75° C. The air feed rate was maintained at 23 kg/h (space velocity=1.95 $m^3{}_n$ air/kg Co(NO$_3$)$_2$.6H$_2$O)/h). The temperature of the fluidized bed was increased at a rate of 0.4° C./min to a maximum temperature of 250° C. The temperature was maintained at 250° C. for 6 hours to obtain a catalyst precursor.

EXAMPLE 2

Preparation of Modified Catalyst Precursor B

A cobalt catalyst precursor was prepared in a similar manner to catalyst precursor A, and subsequently modified with silica, to obtain a modified catalyst precursor B. An impregnation method was used to achieve the modification. Thus, silicon, in the form of TEOS (tetra ethoxy silane, 2,5 kg) as precursor, was added to 20 L ethanol at 60° C. Ethanol was thus used as the impregnation solvent. 20 kg of catalyst precursor A of Example 1, was added to this solution, which was then kept at 50° C.-75° C. for 1 hour. Subsequently, the solvent was removed under vacuum at 0.03-0.2 bar(a), with a jacket temperature of the drier equipment of 95° C. The drying step was terminated after 2 hours, and the resultant dried impregnated support was loaded immediately into a fluidized bed calciner. The loading took about 1 to 2 minutes, and the temperature remained at its set point of about 75° C. The temperature of the fluidized bed was increased at a rate of 0.4° C./min to a maximum temperature of 250° C. The dried and impregnated material was calcined in air at 250° C. for 6 hours in the fluidized bed calciner at a space velocity of 0.9 $m^3{}_n$ air/kg catalyst precursor/h to obtain a modified catalyst precursor, ie modified catalyst precursor B. The silicon content was analysed as 0.8 Si atoms/nm$^2$ catalyst precursor.

EXAMPLE 3

Laboratory Slurry Phase Fischer-Tropsch Synthesis

Cobalt catalyst precursors (modified or unmodified) were reduced prior to Fischer-Tropsch synthesis in a tubular reactor at a hydrogen space velocity of 200 ml$_n$ hydrogen/g catalyst/h and atmospheric pressure. The temperature was increased to 425° C. at 1° C./min, after which isothermal conditions were maintained for 16 hours. Comparative Catalyst A was thus obtained from catalyst precursor A, while Catalyst B was thus obtained from modified catalyst precursor B.

Between 10 g and 30 g of the resultant reduced catalyst, ranging between 38 μm to 150 μm, was suspended in 300 ml molten wax and loaded in a CSTR with an internal volume of 500 ml. The feed gas consisted of hydrogen and carbon monoxide in a H$_2$/CO molar ratio from 1.5/1 to 2.3/1. This reactor was electrically heated and sufficiently high stirrer speeds were employed so as to eliminate any gas-liquid mass transfer limitations. The feed flow was controlled by means of Brooks mass flow controllers, and space velocities ranging from 2 and 4 $m^3{}_n$/kg$_{cat}$hr were used. GC analyses of the permanent gases as well as the volatile overhead hydrocarbons were used in order to characterize the product spectra.

The laboratory test runs were completed under realistic Fischer-Tropsch synthesis conditions:

| | |
|---|---|
| Reactor temperature: | 220° C. |
| Reactor pressure: | 20 bar |
| % (H$_2$ + CO) conversion: | 50-70% |
| Feed gas composition: | |
| H$_2$: | ca 50 vol % |
| CO: | ca 25 vol % |
| Balance: | Ar, N$_2$, CH$_4$ and/or CO$_2$ |

Having applied a reported cobalt based Fischer-Tropsch kinetic equation, such as:

$$r_{FT}=(k_{FT}P_{H2}P_{co})/(1+KP_{co})^2$$

the Arrhenius derived pre-exponential factor of $k_{FT}$ was estimated for each of the reported runs. By defining the relative intrinsic Fischer-Tropsch activity as (pre-exponential factor of catalyst X after reduction test)/(pre-exponential factor of catalyst A), where X is catalyst A or B, the intrinsic Fischer-Tropsch activities of the cobalt catalysts could be compared. The initial relative intrinsic Fischer-Tropsch activity is determined after 15 hours on line, as given in Table 1. It is clear that modification of the catalyst precursor had no significant influence on the intrinsic Fischer-Tropsch characteristics when compared to the untreated supported cobalt catalyst, Catalyst A.

TABLE 1

Laboratory CSTR Fischer-Tropsch synthesis performance comparison between catalysts prepared on untreated (Catalyst A) and silica modified cobalt catalyst (Catalyst B)

| Run number | 233$ Catalyst A | 193(SR3) Catalyst B |
|---|---|---|
| Synthesis conditions: | | |
| Calcined catalyst mass | 20.6 | 12.6 |
| Reactor temp (° C.) | 221.0 | 220.2 |
| Reactor pressure (bar) | 20.0 | 20.9 |
| Time on stream (h) | 15.0 | 15.0 |
| Feed gas composition: | | |
| H$_2$(vol %) | 52.2 | 51.6 |
| CO (vol %) | 26.4 | 26.4 |
| (Balance = Ar, CH$_4$, CO$_2$) | | |
| Syngas (H$_2$ + CO) space velocity ($m^3{}_n$/(kg cat.h) | 3.0 | 3.8 |
| Reactor partial pressures (bar) | | |
| H$_2$ | 4.5 | 5.0 |
| CO | 2.5 | 2.9 |
| H$_2$O | 4.8 | 4.7 |
| CO$_2$ | 0.3 | 0.3 |
| Synthesis performance | | |
| Conversion: (% syngas) | 68.3 | 65.7 |
| Relative intrinsic specific Fischer-Tropsch activity factor | 1.0 | 1.2 |
| % C-atom CH$_4$ selectivity | 4.3 | 6.7 |
| % CO of total amount of CO converted to CO$_2$ | 3.3 | 1.5 |

EXAMPLE 4

Pilot Plant Fischer-Tropsch Synthesis Tests

During a confidential Pilot Plant Fischer-Tropsch synthesis test run, using 5 kg of the catalyst A in a 11 m high bubble column reactor with an external recycle, the secondary filtered wax product turned grey after about 10 days on-line and the cobalt content increased to 350 mass ppm after 25 days on line, as shown in FIG. 1. The secondary filtered wax product is defined as the wax product produced in the Fischer-Tropsch synthesis test run and which has been subjected to a primary solids separation step, and thereafter to secondary ex-situ filtration through Whatmans 42 (trademark) filter paper.

The test run was performed under realistic Fischer-Tropsch synthesis conditions:

| Reactor temperature: | 230° C. |
|---|---|
| Reactor pressure: | 20 Bar |
| % ($H_2$ + CO) conversion: | 50-80% |
| Feed gas composition: | |
| $H_2$: | ca 50 vol % |
| CO: | ca 25 vol % |
| Balance: | Ar, $N_2$, $CH_4$ and or $CO_2$ |

The pilot plant test run was repeated with Catalyst B, using an identical quantity of Catalyst B and the same Fischer-Tropsch synthesis conditions.

The Pilot Plant Fischer-Tropsch synthesis test run performed on Catalyst B showed a substantial improvement with respect to the submicron cobalt particulate contamination in the secondary filtered wax product (FIG. 1). After 67 days on line, Catalyst B with 0.8 Si atoms/nm$^2$ catalyst precursor did not show any cobalt in the secondary filtered wax product.

These results indicated that modification of a pure $Al_2O_3$ supported cobalt catalyst precursor with silica (of which the precursor is TEOS) produces a successful catalyst that under realistic Fischer-Tropsch conditions produces a clean wax product, with little or no cobalt contamination. The hypothesis for the successful demonstration of this modified cobalt catalyst may be described as follows:

As hereinbefore set out, hydrothermal attack is defined as the sintering of the support, eg $Al_2O_3$, due to exposure to high temperature and water. This may result in a weak cohesion between alumina particles and a loss in mechanical strength. This loss in mechanical strength may result in the generation of cobalt rich ultra-fine particulates due to the turbulent environment in the slurry bubble column reactor and contamination of the wax product produced during Fischer-Tropsch synthesis. The hydrothermal attack and sintering can be a gradual process, therefore the high cobalt levels observed for the unmodified cobalt catalyst (Catalyst A) were only observed after 15 days on-line.

Silica modification of the finally prepared cobalt catalyst may result in the modification of the hydroxyl groups on the surface of the $Al_2O_3$ support of the catalyst by forming Si—O—Al bonds. After decomposition of the organic groups of the silicon precursor, a silica monolayer may cover the surface of the catalyst. The silica may prevent the sintering of the support due to blocking of "sites" at which sintering could be initiated. The presence of silica on the surface may also prevent the transformation of the $Al_2O_3$ support, that consists of $\gamma$-$Al_2O_3$ and $\delta$-$Al_2O_3$ the support of choice used in this invention, to $\delta$-$Al_2O_3$ and $\alpha$-$Al_2O_3$. The transformation may occur due to sintering and a loss of surface area. The transformation corresponds to a better ordering of aluminium ions to a more crystalline phase, ie $\delta$-$Al_2O_3$ and $\alpha$-$Al_2O_3$ phase, due to diffusional atom movements associated with the sintering phenomenon, as described in P. Burtin, J. P. Brunelle, M. Pijolat, and M. Soustelle in Applied Catalysis, 34 (1987) at page 225. Silica may therefore prevent the crystallisation/transformation of the $Al_2O_3$ support and prevent generation of ultra-fine particulates.

Additional experimental work was performed in support of this hypothesis, as set out in Example 5.

EXAMPLE 5

A pure $Al_2O_3$ support and a silica modified $Al_2O_3$ support (prepared as described in Example 1 of EP 1058580) were added to water at 20° C. and 60° C. respectively, and stirred for 6 hours. Chemical analyses of the solution after filtration through a 0.22 µm Millipore (trademark) filter, showed that $Al_2O_3$ had dissolved, but only to a small extent. A similar experiment was performed on cobalt catalysts prepared from these pure $Al_2O_3$ and silica modified $Al_2O_3$ supports. These cobalt catalysts were prepared as described in Example 1 of U.S. Pat. No. 6,455,462. No significant difference was found in the aluminium and cobalt levels remaining on the catalysts. 99.91% and 99.98% respectively of the aluminium remained on both catalysts and 99.44% and 99.38% respectively of cobalt remained on both catalysts.

Experiments were then performed on Catalysts A and B at 200° C. in autoclave vessels, and samples of the solutions were taken after 2, 4 and 6 hours. This test was performed in an effort to simulate Fischer-Tropsch synthesis conditions, although the samples were drenched in water and a separate water phase is not present at realistic Fischer-Tropsch conditions.

The solutions could not be filtered due to the extremely fine nature of particles that blocked the 0.22 µm Millipore (trademark) filter paper. The slurry densities of the solutions of 2, 4 and 6 hours are given in Table 1.

TABLE 1

Chemical analyses of solutions after interaction with Catalysts A and B at 200° C.

| | Slurry density (mg/ml) | | |
|---|---|---|---|
| Sample | 2 hours | 4 hours | 6 hours |
| Catalyst A | 115.2 | — | 238.2 |
| Catalyst B | 12.8 | 21.6 | 37.6 |

Table 1 is visually illustrated in FIG. 2.

From FIG. 2, it is clear that the silica modification of the $Al_2O_3$ support had a significant impact on the ability of the silica modified $Al_2O_3$ supported cobalt catalyst to withstand attack from the superheated steam/water. This experiment was a severe test on the catalysts, ie 200° C. and a water partial pressure of 16.2 bar(a), and should be regarded as an accelerated test.

The invention claimed is:

1. A process for preparing a modified cobalt-based Fischer-Tropsch synthesis catalyst, which process comprises introducing a soluble modifying component precursor of the formula Mc(OR)$_x$, where Mc is a modifying component selected from the group consisting of Si, Ti, Cu, Zn, Zr, Mn, Ba, Ni, Na, K, Ca, Sn, Cr, Fe, Li, Tl, Sr, Ga, Sb, V, Hf, Th, Ce, Ge, U, Nb, Ta, W and La, R is an alkyl or acyl group, and x is an integer having a value of from 1 to 5, onto and/or into a cobalt-based Fischer-Tropsch synthesis catalyst precursor comprising a porous pre-shaped catalyst support having supported thereon cobalt in an oxidized form, wherein the catalyst support is selected from the group consisting of alumina ($Al_2O_3$), titania, magnesia, silica-alumina and zinc oxide, to obtain a modified cobalt-based Fischer-Tropsch synthesis catalyst precursor, with a sufficient amount of the modifying component precursor being used such that the modifying component level in the modified catalyst precursor is at least 0.06 modifying component atoms per square nanometer of the catalyst precursor surface area; and reducing the modified cobalt-based Fischer-Tropsch synthesis catalyst precursor, to obtain the modified cobalt-based Fischer-Tropsch synthesis catalyst.

2. A process according to claim 1, wherein Mc is Si.

3. A process according to claim 2, wherein the quantity of silicon precursor that is used is such that the mean pore radius (expressed in m) of the freshly reduced catalyst remains larger than $((L_{min})^2\theta\phi)\times10^{-19}$ (Equation 1) and smaller than $((L_{max})^2\theta\phi)\times10^{-18}$ (Equation 2), where:

$L_{min}$ is the minimum particle size of the silicon modified catalyst precursor, expressed in m;

$L_{max}$ is the maximum particle size of the silicon modified catalyst precursor, expressed in m;

$\theta$ is the active site density, expressed in terms of the number of metallic cobalt surface atoms per $m^2$ of freshly reduced catalyst surface area; and $\phi$ is the particle void fraction of the freshly reduced catalyst.

4. A process according to claim 2, wherein the introduction of the silicon precursor onto and/or into the catalyst precursor is effected by dissolving it in an impregnation solvent to form a solution; admixing the catalyst precursor with the solution to form a treatment mixture; maintaining the treatment mixture at an elevated temperature for a period of time to impregnate the silicon into and/or onto the catalyst precursor; and removing excess solvent.

5. A process according to claim 1, wherein the porous pre-shaped catalyst support of the catalyst precursor is alumina ($Al_2O_3$).

6. A cobalt-based Fischer-Tropsch synthesis catalyst produced by the process of claim 1.

7. A process for preparing a modified cobalt-based Fischer-Tropsch synthesis catalyst, which process comprises introducing a soluble modifying component precursor of the formula $Mc(OR)_x$, where Mc is a modifying component selected from the group comprising Si, Ti, Cu, Zn, Zr, Mn, Ba, Ni, Na, K, Ca, Sn, Cr, Fe, Li, Tl, Sr. Ga, Sb, V, Hf, Th, Ce, Ge, U, Nb, Ta, W and La, R is an alkyl or acyl group, and x is an integer having a value of from 1 to 5, onto and/or into a cobalt-based Fischer-Tropsch synthesis catalyst precursor comprising a porous pre-shaped catalyst support having supported thereon cobalt in an oxidized form, wherein the catalyst support is selected from the group consisting of alumina, titania, magnesia, silica-alumina and zinc oxide, to obtain a modified cobalt-based Fischer-Tropsch synthesis catalyst precursor; and reducing the modified cobalt-based Fischer-Tropsch synthesis catalyst precursor, to obtain a modified cobalt-based Fischer-Tropsch synthesis catalyst, wherein the quantity of modified component precursor that is used is such that the mean pore radius (expressed in m) of the freshly reduced catalyst remains larger than $((L_{min})^2\theta\phi)\times10^{-19}$ (Equation 1) and smaller than $((L_{max})^2\theta\phi)\times10^{-18}$ (Equation 2), where:

$L_{min}$ is the minimum particle size of the modified catalyst precursor, expressed in m;

$L_{max}$ is the maximum particle size of the modified catalyst precursor, expressed in m;

$\theta$ is the active site density, expressed in terms of the number of metallic cobalt surface atoms per $m^2$ of freshly reduced catalyst surface area; and $\phi$ is the particle void fraction of the freshly reduced catalyst.

* * * * *